June 14, 1932. W. S. HAYFORD 1,863,048
METHOD OF JOINING WIRES
Filed June 15, 1929
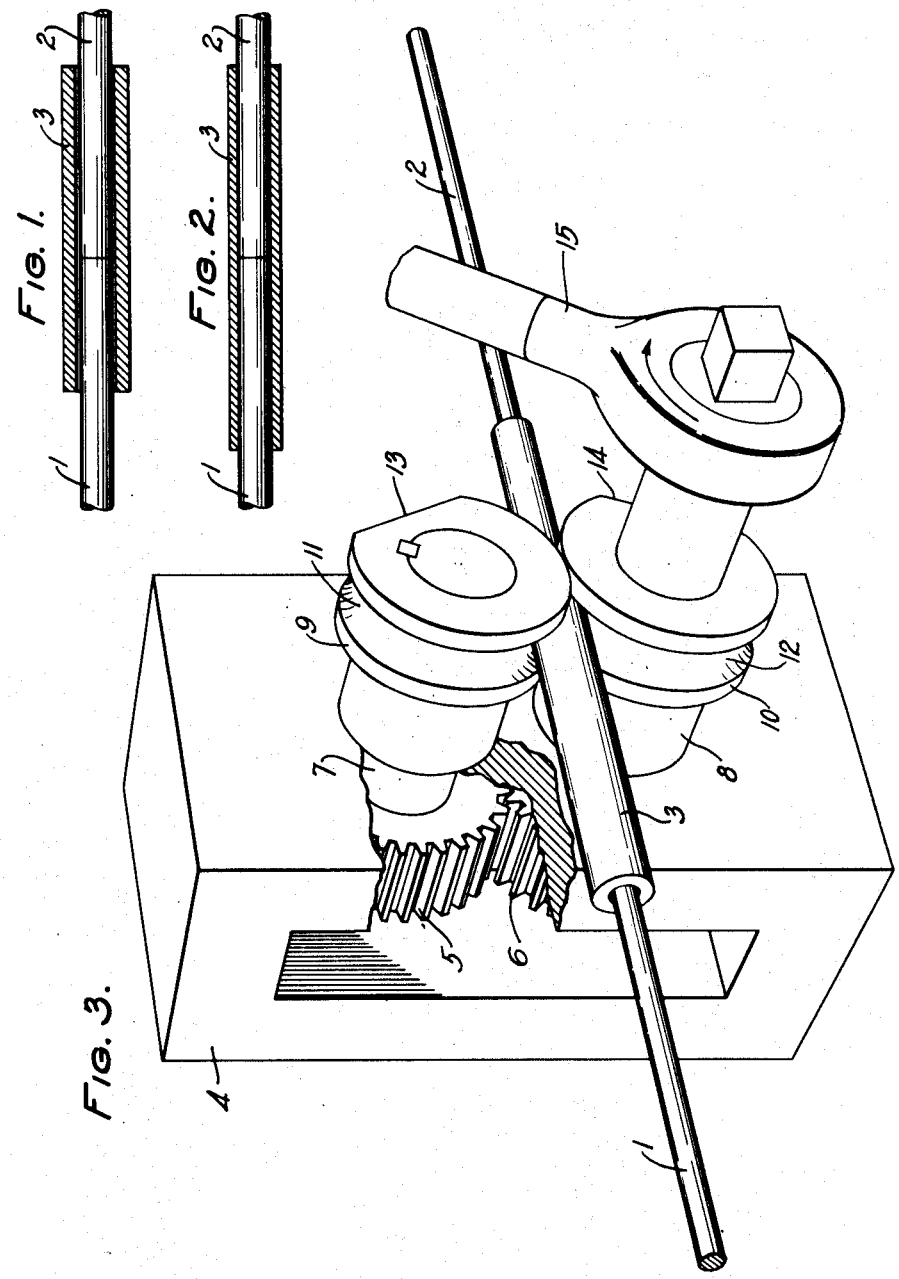
INVENTOR
W. S. HAYFORD
BY J. MacDonald
ATTORNEY

UNITED STATES PATENT OFFICE

WALTER S. HAYFORD, OF MORRISTOWN, NEW JERSEY, ASSIGNOR TO BELL TELEPHONE LABORATORIES, INCORPORATED, OF NEW YORK, N. Y., A CORPORATION OF NEW YORK

METHOD OF JOINING WIRES

Application filed June 15, 1929. Serial No. 371,254.

This invention relates to a method of making joints in wire, and its object is to provide a method of making joints which requires only a relatively small amount of energy to be expended by the workman while producing a joint which will hold to the breaking point of the wire itself and one which will be impervious to moisture and thus will not corrode and increase its electrical resistance.

In the joining of electrical conductors and the like, particularly wires which are used on open and exposed lines, it is very essential that not only a strong joint be made but also one that will not be affected by the weather. It is, therefore, very necessary that when a metallic sleeve is used to join the abutting ends of wire together that a method be employed which will intimately join the sleeve to the wires in such a manner that a substantially homogeneous mass is formed.

In order to overcome the difficulties that have hertofore been present in the methods used for the joining of abutting ends of wire together by means of a metal sleeve, and also to render unnecessary any special skill on the part of the operator and to speed up the making of a joint, I have devised a method in which the joint is formed by inserting the ends to be joined in a metal sleeve softer than the wires to be joined and rolling the metal sleeve from one end to the other, thus driving out any moisture or gases between the sleeve and the wire and forming a strong and durable joint. It has been found that a joint made in accordance with the invention does not permit the circulation of any gas or moisture between the sleeve and the wire.

While joints have been made by forcing a sleeve into intimate contact with the abutting ends of the wire, for instance by a drawing process, only low pressures are obtained between the sleeve and wire. This is inherent in drawing processes, because there is a pull on the sleeve after the dies have performed their work at any given point. This pull causes a sort of neck in the sleeve beyond the die; that is, the pull reduces the thickness of the sleeve as the drawing operation proceeds, since the metal of the sleeve is pulled from the inner as well as the outer surface of the sleeve and reduces the deformation previously produced by the die. The material of the sleeve that is pulled from the inside portion of the sleeve, in effect, causes the sleeve to be pulled away from the wire. The sleeve decreases its thickness at the expense of the material of the sleeve and takes material from the inner and outer surfaces of the sleeve to do it. The action is somewhat similar to that which takes place in a rubber band when it is pulled or stretched. That is why only low pressures can be secured in drawing methods. Due to these low pressures a relatively long length of sleeve is necessary to make a joint having a given holding strength. Thus, not only is more material required in making drawn joints, but more time.

In applicant's method since no work is done at all on a given point on the sleeve after it passes the center line of the positively driven rollers the holding forces applied by the tendency of the hard drawn copper wire to resume its shape acting against the circumferential tension in the copper sleeve, are preserved. It should be understood that the copper wire is harder than the material of the sleeve and that the wire is compressed by the rollers within its elastic limits whereas the softer sleeve is stretched beyond its elastic limits.

The accompanying drawing illustrates one means for carrying out my invention which has been employed by me for forming joints in accordance with my invention.

Referring to the drawing,

Fig. 1 is a cross-sectional view of a metallic sleeve having the abutting ends of the wire inserted therein before being subjected to the action of the rolling tool;

Fig. 2 is a view similar to Fig. 1 but illustrates the sleeve and wires after having been rolled by my method; and Fig. 3 illustrates one form of tool for carrying out my invention.

Referring now to Fig. 1, the wires 1 and 2 are positioned in the sleeve 3, with their ends in abutting relation. It is desirable though not essential that the wire at the end from which the rolling begins be inserted into the sleeve a greater distance than the other. The reason for this is that in order that the abutting ends of the wire will be approximately in the center of the sleeve when the joint is completed (see Fig. 2) allowance must be made at the start for the amount of material which will be rolled over on the other wire. This can be readily observed by referring to Fig. 1 of the drawing in which the wire 2 extends into the sleeve 3 a greater distance than the wire 1, inasmuch as in this instance the rolling action starts at the right and continues to the left.

Fig. 3 is a simple mechanism for carrying out my invention and illustrates a sleeve 3 in the process of being rolled on the abutting ends of the two wires 1 and 2 to form a joint. The frame 4, has journalled therein, a pair of intermeshed gears 5 and 6, gear 6 being the driving gear and gear 5 being the driven gear, said gears having parallel shafts 7 and 8 extending through the frame 4, and projecting some distance therefrom. Affixed to the ends of the shafts 7 and 8 and in close contact with each other is a pair of rollers 9 and 10, said rollers being provided on their faces with grooves 11 and 12, the diameter of the aperture formed by these grooves being less than the diameter of the sleeve to be rolled. The rollers 9 and 10 are each provided with a flat surface 13 and 14, in order that the wires may be inserted between them at the start of the operation and removed at the finish. Suitable means 15 is provided for operating the rollers 9 and 10.

Thus, it can be readily observed that upon the operation of the handle 15 in the direction of the arrow the shaft 8 with its gear 6 and roller 10 will be rotated. Inasmuch as the driving gear 6 is intermeshed with the driving gear 5, which is mounted on the same shaft 7 as the roller 9, the roller 9 will revolve in a direction opposite to that of the roller 10, thereby forcing the sleeve 3 between the rollers 9 and 10 which squeeze the sleeve into intimate contact with the wires 1 and 2.

The method of this invention makes it possible to employ a very light tool due to the relatively small amount of energy which has to be expended by the workman and this is particularly desirable in working on open wire lines. Drawing and swaging are impractical for such work due to the relatively great amount of energy the workman has to expend in making a joint by such methods, and also to the weight of the tool required to make a joint by either of the above methods.

I do not limit myself to any specific form of rolling tool as it is obvious that many modifications of this tool may be made by those skilled in the art and that I am not restricted to the example shown and am only limited by the scope of the appended claim.

What is claimed is:

The method of making joints in wires or the like which consists in inserting in opposed relation the ends of the wires to be joined in a relatively soft metallic sleeve and then rolling said sleeve into intimate contact with the wires to be joined, said rolling action starting at one end of the sleeve and continuing to the other.

In witness whereof, I hereunto subscribe my name this 14th day of June, 1929.

WALTER S. HAYFORD.